Oct. 11, 1932.　　　P. J. CANNON　　　1,882,483
CLAMPING MEANS
Filed Sept. 19, 1929　　3 Sheets-Sheet 1

INVENTOR
PATRICK J. CANNON
by his attorneys
Howen and Howen

Oct. 11, 1932. P. J. CANNON 1,882,483
CLAMPING MEANS
Filed Sept. 19, 1929   3 Sheets-Sheet 2
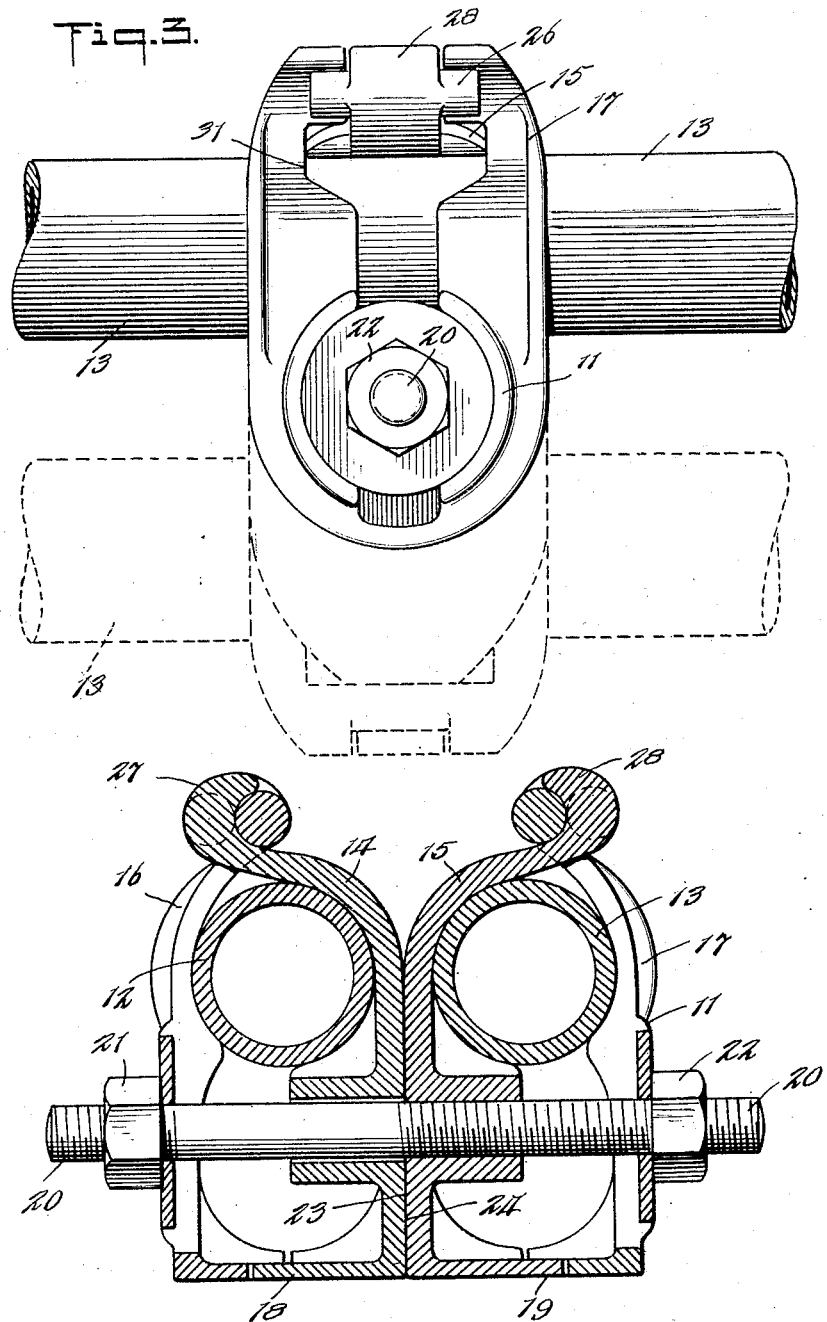

Oct. 11, 1932.    P. J. CANNON    1,882,483
CLAMPING MEANS
Filed Sept. 19, 1929    3 Sheets-Sheet 3
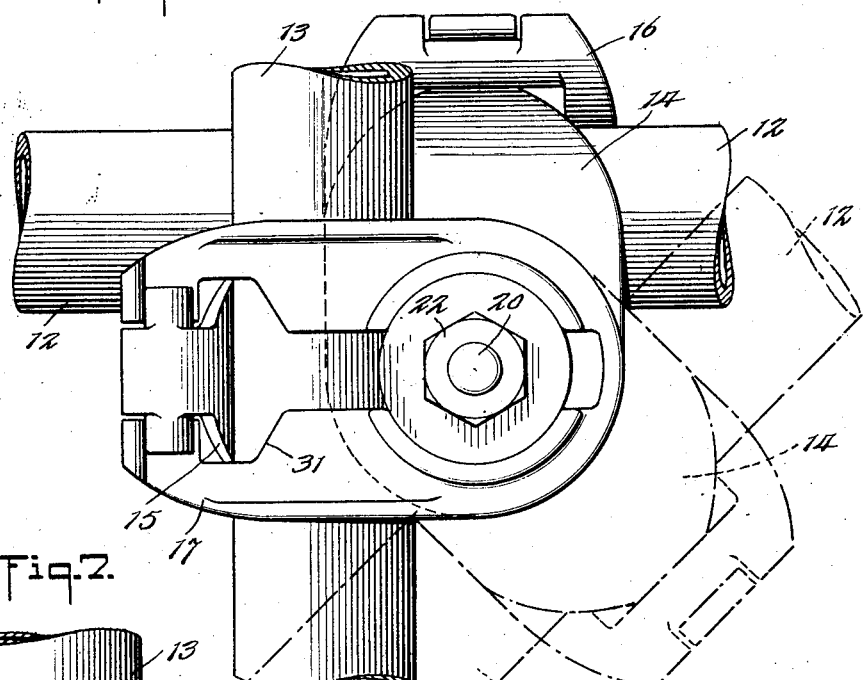
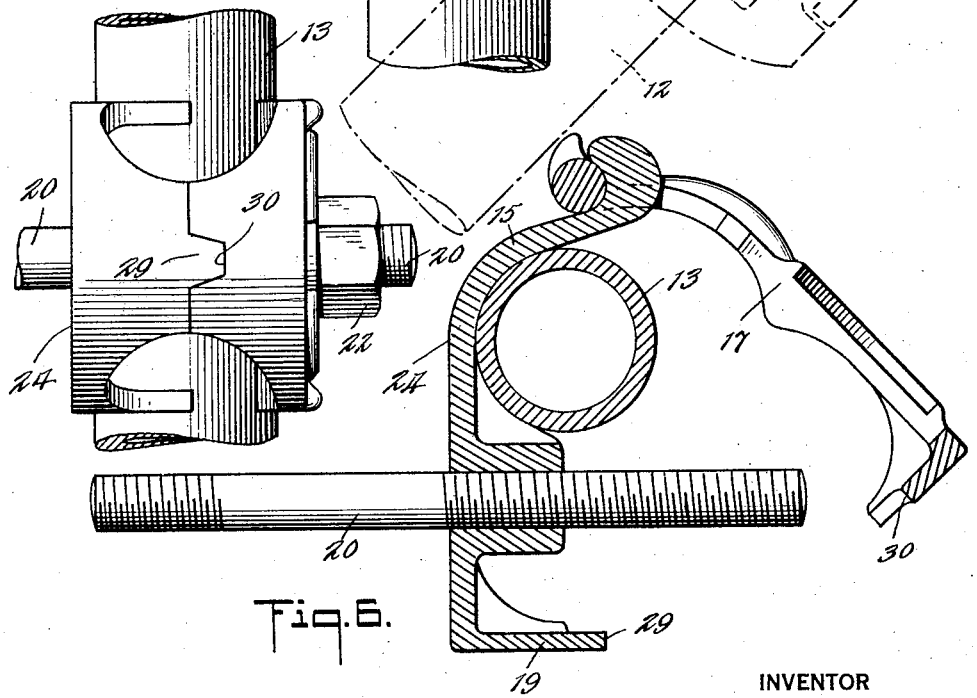
INVENTOR
PATRICK J. CANNON Patented Oct. 11, 1932

1,882,483

UNITED STATES PATENT OFFICE

PATRICK J. CANNON, OF NEW YORK, N. Y.

CLAMPING MEANS

Application filed September 19, 1929. Serial No. 393,751.

My invention relates to clamping means, and more particularly clamping means which is adapted to hold two members in any desired angular relation to one another.

One object of my invention is to provide an adjustable clamping means for fastening light structural members together at any desired angle. Another object is to provide such a clamp which will be simple and inexpensive to make, yet serviceable and rugged. Further objects will be apparent upon consideration of the present description.

The invention is described and illustrated by way of example in its application to a pair of pipes—for instance such pipes as are used to support a platform over a sidewalk adjacent a building which is being constructed or demolished. Obviously the invention is not limited to this application.

In the accompanying drawings—

Figure 1:
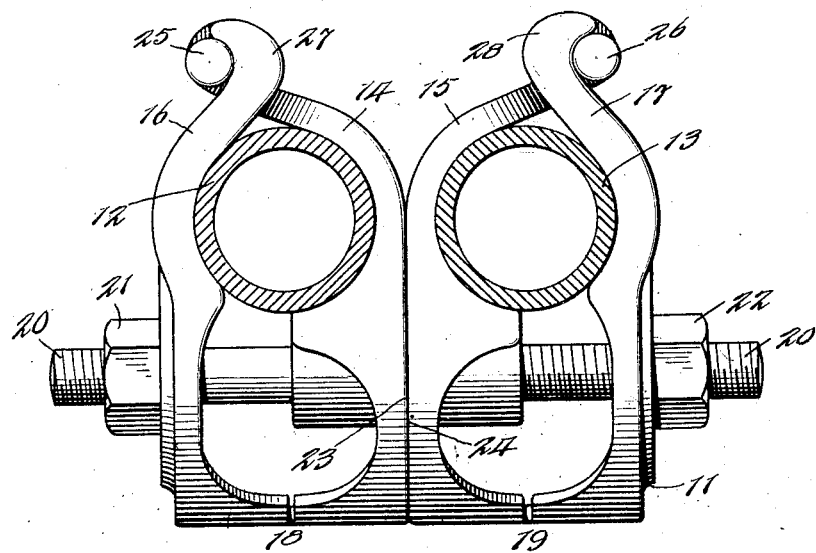
Figure 2:
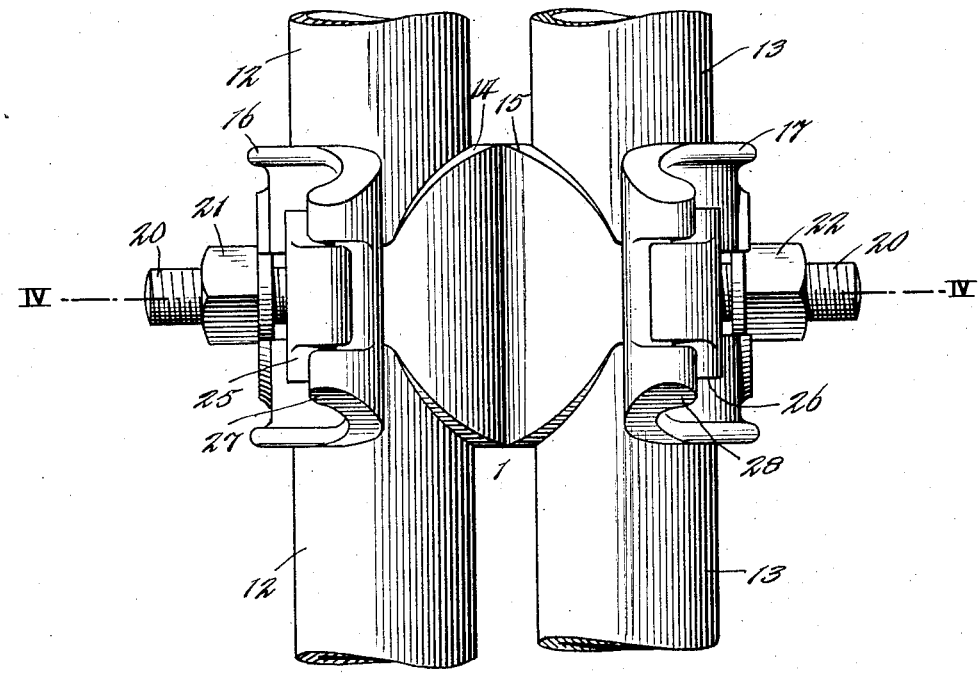

Figure 1 is an elevation of one form of the invention, the pipes being seen in end section, Fig. 2 is a view at right angles to Figure 1, the parts being viewed as from above in Figure 1, Fig. 3 is a view at right angles to Figure 1, the parts being viewed as from the right in Figure 1, Fig. 4 is a section taken on the line IV—IV of Fig. 2, Fig. 5 is an elevation similar to Fig. 3 showing the pipes held at an angle to each other, Fig. 6 is a sectional view showing how the clamp is put together, and Fig. 7 is a view of one unit of the clamp as seen from below in Figure 1.

My clamping means comprises a certain novel construction and arrangement of parts which is simple and inexpensive whereby attachment to the members and adjustment of angularity between the members may be easily accomplished. More specifically, I employ specially-designed means for clamping the members together including a single means for clamping one member and at the same time fixing the angular relation of two members.

The invention may be better understood from the example illustrated in the drawings. In this embodiment there is shown a clamp 11 for clamping together two members 12 and 13 at any desired angle to each other. The members are here illustrated as pipes, but obviously they need not be pipes. The clamp comprises two similar elements 14 and 15 which may be of identical construction, and two other similar elements 16 and 17 which may also be of identical construction, but dissimilar to the first two. The elements are grouped into two units 18 and 19 each unit comprising two dissimilar elements 14 and 16 or 15 and 17 adapted to be connected together. Each unit is adapted to clamp a member 12 or 13 firmly between its two elements 14 and 16 or 15 and 17. I prefer to employ a bolt 20 and nuts 21 and 22 for clamping the units about the members or pipes.

Means are provided for clamping the units 18 and 19 in any desired angular relation to each other, thus fixing the angular relation of the two pipes 12 and 13. For this purpose I may dispose the units 18 and 19 in such manner that each has a face adapted to bear against a similar face upon the other member and prevent relative rotation of the units. Thus the element 14 has a face 23 which contacts with a face 24 upon the element 15. I may then employ the same bolt 20 and nuts 21 and 22 as are used for clamping each unit about a pipe to cause the faces 23 and 24 to bear against each other and prevent relative angular movement of the units. Thus by using a single bolt 20 and a single pair of nuts 21 and 22, I provide means for clamping the units in any desired angular relation to each other and at the same time clamp the two elements of each unit about a pipe.

Preferably the bolt 20 is made fast in the element 15 of the unit 19 (see Fig. 4) the corresponding element 14 being loose on the bolt. When such a construction is employed, as will be readily apparent, loosening the nut 22 adjacent the unit 19 will serve to loosen the clamping of the unit about the member 13, but will not loosen the angular clamping of the units. By loosening the nut 21 on the other hand, not only is the clamping of the unit 18 about the member 12 loosened, but the relative angular fixation of the units is also loosened.

It may be well to mention here that by means of the present invention two pipes may be clamped in any angular relation whatever to each other. Any angularity in a plane at right angles to a pipe may be attained simply by loosening the clamp turning it bodily about the member as desired, and tightening it again. Any angularity whatever in a plane parallel to the axis of a member may be attained by loosening the units with respect to each other, turning one of them about the bolt 20, and tightening the nuts again.

In the form of the invention here illustrated the elements 14 and 15 are formed with trunnion ends 25 and 26 respectively and the members 16 and 17 are formed with hooked ends 27 and 28. The two ends are the hinge portions of the respective elements, and when in place as illustrated form a trunnion-and-hook hinge, and the two elements form a hinged unit. At the end of each unit opposite the hinge—that is to say at the end on the other side of the bolt from the member—the elements may contact in a tongue 29 and groove 30 construction such as that illustrated in Fig. 7. This tongue and groove contact increases the solidity and ruggedness of the unit and prevents relative turning about the bolt of the pairs of elements when the clamp is in place. The trunnion and hook ends, together with the tongue and groove ends, form the connecting portions of the several elements.

I prefer to cut away a portion of the elements 16 and 17 as illustrated at 31 in Figs. 3 and 5. By so doing I am enabled to loosen the bolt, disconnect the hinge, and remove the element 16 or 17 from the unit without completely unscrewing the nut from the bolt.

Naturally, other embodiments than that here illustrated will occur to those skilled in the art, which do not depart from the proper scope of the present invention. For instance, more than two units may conceivably be employed in a single clamping means. Without limiting myself, therefore, to the form here illustrated and described for the purpose of indicating how the invention may be applied,

I claim:—

1. A clamp for fastening together in any desired angular relation a pair of members, comprising a bolt, an element having a trunnion end embracing said bolt and extending substantially at right angles thereto, and a second element having a hooked end hinged to the trunnion end of said first element extending on both sides of said bolt, said pair of elements together forming a hinged unit embracing a member between the trunnion-and-hook hinge and said bolt, in combination with a second hinged unit similar to the first upon said bolt also embracing a member, threads on said bolt, and nuts on said bolt beyond the units adapted to bear upon the units when tightened and to cause them to grip the members and to bear against each other.

2. A clamp for fastening together in any desired angular relation a pair of members, comprising a bolt, an element having a trunnion end embracing said bolt and extending substantially at right angles thereto, and a second element having a hooked end hinged to the trunnion end of said first element extending on both sides of said bolt, said pair of elements together forming a hinged unit embracing a member between the trunnion-and-hook hinge and said bolt, in combination with a second hinged unit similar to the first having its trunnion-ended element fixed to said bolt, said second hinged unit also embracing a member, threads on said bolt, and nuts on said bolt beyond the units adapted to bear upon the units when tightened and to cause them to grip the members and to bear against each other.

3. A clamp for fastening together two members at any desired angle, said clamp comprising two clamping units of two elements each, and a bolt passing through said clamp fast in but one of the elements of one clamping unit, in combination with a nut on one end of said bolt adapted to close the clamp on one member, and a second nut on the other end of said bolt adapted to close the clamp on the second member and also to fix the units of said clamp at an angle.

4. A pipe connection comprising two pipes and a clamp for fastening together said two pipes at any desired angle, said clamp comprising two clamping units of two elements each, and a bolt passing through said clamp fast in but one of the elements of one clamping unit, in combination with a nut on one end of said bolt adapted to close the clamp on one pipe, and a second nut on the other end of said bolt adapted to close the clamp on the second pipe and also to fix the units of said clamp at an angle.

5. Clamping means for fastening two members together at any desired angle to each other, comprising two similar elements having similar connecting portions and two other similar elements having connecting portions dissimilar to those of the first two, said elements being grouped into two units each unit comprising two dissimilar elements adapted to be connected together, each unit being adapted to clamp a member firmly between its two elements, in combination with nut and bolt means for clamping each unit about a member and at the same time clamping said units in any desired angular relation to each other.

6. Clamping means for fastening together two members at any desired angle to each other, comprising two similar elements, having similar hinge portions, two other similar elements having hinge portions dissimilar to the first two, said elements being grouped into two hinged units each unit comprising two dissimilar elements, each unit being adapted to clamp a member firmly between its two elements, in combination with a bolt passing through the two units fixed in one element of one unit, and nuts on the ends of said bolt, one of said nuts being adapted when tightened to clamp about a member the unit in one element of which said bolt is fixed, and the other nut being adapted when tightened to clamp the other unit about another member at the same time clamping said units in any desired angular relation to each other.

7. A clamp for fastening together in any desired angular relation a pair of members, comprising a bolt, an element having a trunnion end embracing said bolt and extending substantially at right angles thereto, and a second element having a hooked end detachably hinged to the trunnion end of said first element and slotted to permit passage of the bolt therethrough, said slot being shaped to permit detachment of said hooked element by longitudinal movement of said element relatively to said trunnion element while said bolt lies in the slot said pair of elements together forming a unit adapted to clamp a member firmly between its two elements, in combination with a second hinged unit similar to the first upon said bolt also embracing a member, threads on said bolt, and nuts on said bolt beyond the units adapted to bear upon the units when tightened and to cause them to grip the members and to bear against each other.

In testimony whereof I have signed my name to this specification.

PATRICK J. CANNON.